(12) United States Patent
Holtz et al.

(10) Patent No.: US 11,758,940 B2
(45) Date of Patent: *Sep. 19, 2023

(54) METHODS AND DEVICES FOR CARTRIDGE AUTHENTICATION

(71) Applicant: Altria Client Services LLC, Richmond, VA (US)

(72) Inventors: Arie Holtz, Jerusalem (IL); Bernard Juster, Netanya (IL); Shmuel Gavrielov, Beit Shemesh (IL)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,017

(22) Filed: Aug. 30, 2021

(65) Prior Publication Data

US 2021/0386115 A1 Dec. 16, 2021

Related U.S. Application Data

(63) Continuation of application No. 15/468,684, filed on Mar. 24, 2017, now Pat. No. 11,134,715.

(51) Int. Cl.
*G06F 21/44* (2013.01)
*A24F 1/00* (2006.01)
(Continued)

(52) U.S. Cl.
CPC ............... *A24F 1/00* (2013.01); *A24F 40/51* (2020.01); *A24F 40/53* (2020.01); *A24F 40/60* (2020.01);
(Continued)

(58) Field of Classification Search
CPC .. A24F 1/00; A24F 40/51; A24F 40/53; A24F 40/60; A24F 40/42; A24F 40/65;
(Continued)

(56) References Cited

U.S. PATENT DOCUMENTS 5,852,590 A 12/1998 de la Huerga
8,689,804 B2 4/2014 Fernando et al.
(Continued)

FOREIGN PATENT DOCUMENTS

CN 203633514 U 6/2014
CN 103932406 A 7/2014
(Continued)

OTHER PUBLICATIONS

Japanese Decision to Grant for corresponding Application No. 2019-551596, dated May 25, 2022, and English-language translation thereof.
(Continued)

*Primary Examiner* — Jeffrey C Pwu
*Assistant Examiner* — Nega Woldemariam
(74) *Attorney, Agent, or Firm* — Harness, Dickey & Pierce, P.L.C.

(57) ABSTRACT

A device comprises a sensor and processing circuitry coupled to the sensor. The sensor is configured to obtain authentication information from an identification label of a cartridge of an electronic vaping device. The processing circuitry is configured to perform authentication of the cartridge based on the authentication information; and determine whether to unlock a battery section of the electronic vaping device to power the cartridge based on a result of the authentication of the cartridge.

28 Claims, 7 Drawing Sheets

(51) Int. Cl.
  *H02J 7/00* (2006.01)
  *A24F 40/51* (2020.01)
  *A24F 40/53* (2020.01)
  *A24F 40/60* (2020.01)
  *G06V 30/224* (2022.01)
  *G06F 1/26* (2006.01)
  *G06K 7/14* (2006.01)

(52) U.S. Cl.
  CPC ............... *G06F 1/26* (2013.01); *G06F 21/44* (2013.01); *G06K 7/1413* (2013.01); *G06K 7/1417* (2013.01); *G06V 30/2253* (2022.01); *H02J 7/00* (2013.01); *H02J 7/0042* (2013.01); *G06F 2221/2129* (2013.01); *H04Q 2213/13515* (2013.01)

(58) Field of Classification Search
  CPC . A24F 47/00; G06F 1/26; G06F 21/44; G06F 2221/2129; G06K 7/1413; G06K 7/1417; G06V 30/2253; H02J 7/00; H02J 7/0042; H04Q 2213/13515; A61M 2016/0024; A61M 2205/502; A61M 2205/8206
  USPC .......................................................... 713/3
  See application file for complete search history.

(56) References Cited

U.S. PATENT DOCUMENTS

| | | | |
|---|---|---|---|
| 9,289,014 | B2 | 3/2016 | Tucker et al. |
| 2012/0174914 | A1 | 7/2012 | Pirshafiey et al. |
| 2013/0081642 | A1 | 4/2013 | Safari |
| 2013/0192623 | A1 | 8/2013 | Tucker et al. |
| 2013/0284192 | A1 | 10/2013 | Peleg et al. |
| 2013/0319440 | A1 | 12/2013 | Capuano |
| 2013/0340775 | A1 | 12/2013 | Juster et al. |
| 2014/0014126 | A1 | 1/2014 | Peleg et al. |
| 2014/0096781 | A1 | 4/2014 | Sears et al. |
| 2015/0053217 | A1 | 2/2015 | Steingraber et al. |
| 2015/0100441 | A1 | 4/2015 | Alarcon et al. |
| 2015/0114408 | A1 | 4/2015 | Lord |
| 2015/0122252 | A1 | 5/2015 | Frija |
| 2015/0136158 | A1 | 5/2015 | Stevens et al. |
| 2015/0164144 | A1 | 6/2015 | Liu |
| 2015/0181945 | A1 | 7/2015 | Tremblay |
| 2015/0189695 | A1 | 7/2015 | Xiang |
| 2015/0196057 | A1 | 7/2015 | Wu |
| 2015/0208731 | A1 | 7/2015 | Malamud et al. |
| 2016/0278431 | A1 | 9/2016 | Liu |
| 2016/0309785 | A1 | 10/2016 | Holtz |
| 2016/0309786 | A1 | 10/2016 | Holtz et al. |
| 2016/0345627 | A1 | 12/2016 | Liu |
| 2016/0366946 | A1 | 12/2016 | Murison et al. |
| 2016/0374397 | A1* | 12/2016 | Jordan .................... A24F 40/53 131/329 |
| 2017/0020191 | A1 | 1/2017 | Lamb et al. |
| 2017/0258135 | A1 | 9/2017 | Yerkic-Husejnovic et al. |
| 2018/0043114 | A1* | 2/2018 | Bowen .................... A24F 40/60 |
| 2018/0093054 | A1 | 4/2018 | Bowen et al. |

FOREIGN PATENT DOCUMENTS

| | | |
|---|---|---|
| CN | 104303524 A | 1/2015 |
| CN | 204426680 U | 7/2015 |
| CN | 105077592 A | 11/2015 |
| CN | 204888731 U | 12/2015 |
| CN | 106235414 A | 12/2016 |
| CN | 106413434 A | 2/2017 |
| EP | 2959786 A1 | 12/2015 |
| JP | H09-311906 A | 12/1997 |
| JP | 2007-274668 A | 10/2007 |
| JP | 2014-500017 A | 1/2014 |
| KR | 10-2012-0029040 A | 3/2012 |
| KR | 10-2015-0039618 A | 4/2015 |
| RU | 2517125 C2 | 5/2014 |
| WO | WO-2014/066730 A1 | 5/2014 |
| WO | WO-2015/035689 A1 | 3/2015 |

OTHER PUBLICATIONS

Chinese Office Action for corresponding Application No. 201880014899.9, dated Nov. 8, 2021, English translation included.
Russian Decision to Grant for corresponding Application No. 2019133117/12(065294), dated Oct. 28, 2021, English translation included.
International Search Report and Written Opinion dated Apr. 30, 2018 in International Application No. PCT/EP2018/057548.
Written Opinion of the International Preliminary Examining Authority dated Mar. 13, 2019 in International Application No. PCT/EP2018/057548.
International Preliminary Report on Patentability dated Jun. 21, 2019 in International Application No. PCT/EP2018/057548.
Non-Final Office Action dated Nov. 26, 2018 in U.S. Appl. No. 15/468,684.
Final Office Action dated May 16, 2019 in U.S. Appl. No. 15/468,684.
Non-Final Office Action dated Dec. 13, 2019 in U.S. Appl. No. 15/468,684.
Final Office Action dated May 6, 2020 in U.S. Appl. No. 15/468,684.
Non-Final Office Action dated Oct. 1, 2020 in U.S. Appl. No. 15/468,684.
Notice of Allowance dated Apr. 7, 2021 in U.S. Appl. No. 15/468,684.
Joyetech eGo; "How to tell if you've got a genuine Joyetech eGo" <https://www.e-cigarette-forum.com/forum/threads/how-to-tell-if-youve-got-a-genuine-joyetech-ego.208117/> retrieved Aug. 11, 2015.
Russian Office action and Search report for Application No. 2019133117, dated Jun. 11, 2021.
Notice of Allowance dated Jun. 9, 2021 in U.S. Appl. No. 15/468,684.
Chinese Office Action for corresponding Application No. 201880014899.9, dated May 19, 2022, English translation included.
Korean Office Action for corresponding Application No. 10-2019-7029523, with English translation included.

\* cited by examiner

METHODS AND DEVICES FOR CARTRIDGE AUTHENTICATION

CROSS-REFERENCE TO RELATED APPLICATION

This application is a Continuation of, and claims priority under 35 U.S.C. § 120 to, U.S. application Ser. No. 15/468,684, filed Mar. 24, 2017, the entire contents of which are incorporated herein by reference.

BACKGROUND

Field

At least some example embodiments relate generally to electronic vaping (e-vaping) devices.

Related Art

An electronic vaping (e-vaping) device includes a cartridge portion and a battery portion. The cartridge portion attaches to the battery portion to enable vaping by an adult vaper. If a counterfeit, expired and/or unsafe cartridge is permitted to function when attached to a battery portion, then the e-vaping device may malfunction, which may result in unwanted consequences such as damage to the e-vaping device.

SUMMARY

At least one example embodiment provides a device comprising: a sensor configured to obtain authentication information from an identification label of a cartridge of an electronic vaping device; and processing circuitry coupled to the sensor. The processing circuitry is configured to perform authentication of the cartridge based on the authentication information; and determine whether to unlock a battery section of the electronic vaping device to power the cartridge based on a result of the authentication of the cartridge.

According to at least one example embodiment, the processing circuitry may be further configured to: detect attachment of the electronic vaping device to the device; and perform the authentication of the cartridge in response to detecting the attachment of the electronic vaping device to the device. The identification label may be one of a barcode, a quick response (QR) code, a near field communication (NFC) tag and special ink. The special ink may be a magnetic ink including a magnetic ink character recognition (MiCR) code. The sensor may include a MiCR reader.

The authentication information may include identification information identifying the cartridge; the device may further include a memory storing reference identification information for a plurality of cartridges; and the processing circuitry may be further configured to perform the authentication of the cartridge by determining whether the identification information corresponds to reference identification information stored in the memory, and unlock the battery section of the electronic vaping device when the identification information corresponds to the reference identification information.

The identification label may further include a watermark, and the authentication information may include digital information corresponding to the watermark. The processing circuitry may be further configured to: perform the authentication of the cartridge by applying a watermark decoding algorithm to the digital information; and unlock the battery section when (i) the identification information corresponds to the reference identification information stored in the memory and/or (ii) application of the watermark decoding algorithm is successful.

The reference identification information corresponding to the identification information may include an expiration date, and the processing circuitry may be further configured to maintain the battery section in a locked state if the expiration date has passed.

The identification label may include a watermark, and the authentication information may include digital information corresponding to the watermark. The processing circuitry may be further configured to: perform the authentication of the cartridge by applying a watermark decoding algorithm to the digital information; and determine whether to unlock the battery section of the electronic vaping device to power the cartridge based on a result of application of the watermark decoding algorithm. The processing circuitry may be further configured to unlock the battery section if the application of the watermark decoding algorithm is successful.

According to at least some example embodiments, the device may further include a first battery and a charger input configured to connect the device to an external power source. The processing circuitry may be further configured to enable charging of a second battery in the battery section via at least one of the first battery or the external power source.

The device may further include a memory having computer-readable instructions stored therein. The processing circuitry may be further configured to execute the computer-readable instructions to perform authentication of the cartridge and to control the battery section.

At least one other example embodiment provides a device comprising: at least one slot configured to receive at least one electronic vaping device; at least one sensor configured to obtain authentication information from an identification label of the at least one electronic vaping device, the authentication information associated with a cartridge of the at least one electronic vaping device; and processing circuitry. The processing circuitry is configured to: perform authentication of the cartridge of the at least one electronic vaping device based on the authentication information; and determine whether to unlock a battery section of the at least one electronic vaping device to power the cartridge based on whether the authentication of the cartridge is successful.

The device may further include a cover element having at least one hollow section corresponding to the at least one slot. The at least one hollow section may be configured to receive a portion of the at least one electronic vaping device that extends out of the at least one slot when inserted in the at least one slot. The cover element may be configured to be opened and closed, and to cover the at least one electronic vaping device when closed.

The processing circuitry may be further configured to detect insertion of the at least one electronic vaping device into the at least one slot by detecting a change in resistance at an interface associated with the at least one slot. The interface may provide an electrical connection between the at least one electronic vaping device and the device.

The at least one sensor may be further configured to obtain the authentication information in response to detecting the insertion of the at least one electronic vaping device into the at least one slot by the processing circuitry.

The identification label may be on the cartridge. The identification label may be one of a barcode, a quick response (QR) code, a near field communication (NFC) tag and special ink. The special ink may be a magnetic ink including a magnetic ink character recognition (MiCR) code, and the at least one sensor may include a MiCR reader.

The authentication information may include identification information for the cartridge. The processing circuitry may be further configured to: determine the authentication of the cartridge is successful when the identification information corresponds to reference identification information stored in a memory of the device; and unlock the battery section when the authentication of the cartridge is successful.

The identification label may further include a watermark, and the authentication information may further include digital information corresponding to the watermark. The processing circuitry may be further configured to: perform the authentication of the cartridge by applying a watermark decoding algorithm to the digital information; and determine the authentication of the cartridge is successful if (i) the identification information corresponds to the reference identification information stored in the memory and (ii) application of the watermark decoding algorithm is successful.

The reference identification information corresponding to the identification information may include an expiration date, and the processing circuitry may be further configured to maintain the battery section in a locked state if the expiration date has passed.

The identification label may include a watermark, and the authentication information may include digital information obtained from the watermark. The processing circuitry may be further configured to: perform the authentication of the cartridge by applying a watermark decoding algorithm to the digital information; and determine whether to unlock the battery section of the at least one electronic vaping device to power the cartridge based on whether the application of the watermark decoding algorithm to the digital information is successful.

The device may further include: two or more slots, each of the two or more slots configured to receive an electronic vaping device; and a divider between the two or more slots, the divider configured to separate any two of the two or more slots. The at least one sensor and the processing circuitry may be positioned on the divider.

The device may further include a display configured to provide information indicative of whether the authentication of the cartridge was successful. The processing circuitry may be further configured to drive the display to provide the information indicative of whether the authentication of the cartridge was successful.

The device may further include an audio output configured to provide information indicative of whether the authentication of the cartridge was successful. The processing circuitry may be further configured to drive the audio output to provide the information indicative of whether the authentication of the cartridge was successful.

The device may further include a memory having computer-readable instructions stored therein. The processing circuitry may be further configured to execute the computer-readable instructions to perform the authentication of the cartridge, and to control the battery section.

The device may further include a first battery, and a charger input configured to connect the device to an external power source. The processing circuitry may be further configured to: determine whether a second battery of the battery section has sufficient charge for powering the cartridge; and enable charging of the second battery in response to determining that the second battery of the battery section does not have sufficient charge for powering the cartridge.

The processing circuitry may be further configured to enable the charging of the second battery of the battery section via at least one of the first battery and the external power source.

BRIEF DESCRIPTION OF THE DRAWINGS

The above and other features and advantages of example embodiments will become more apparent by describing, example embodiments in detail with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
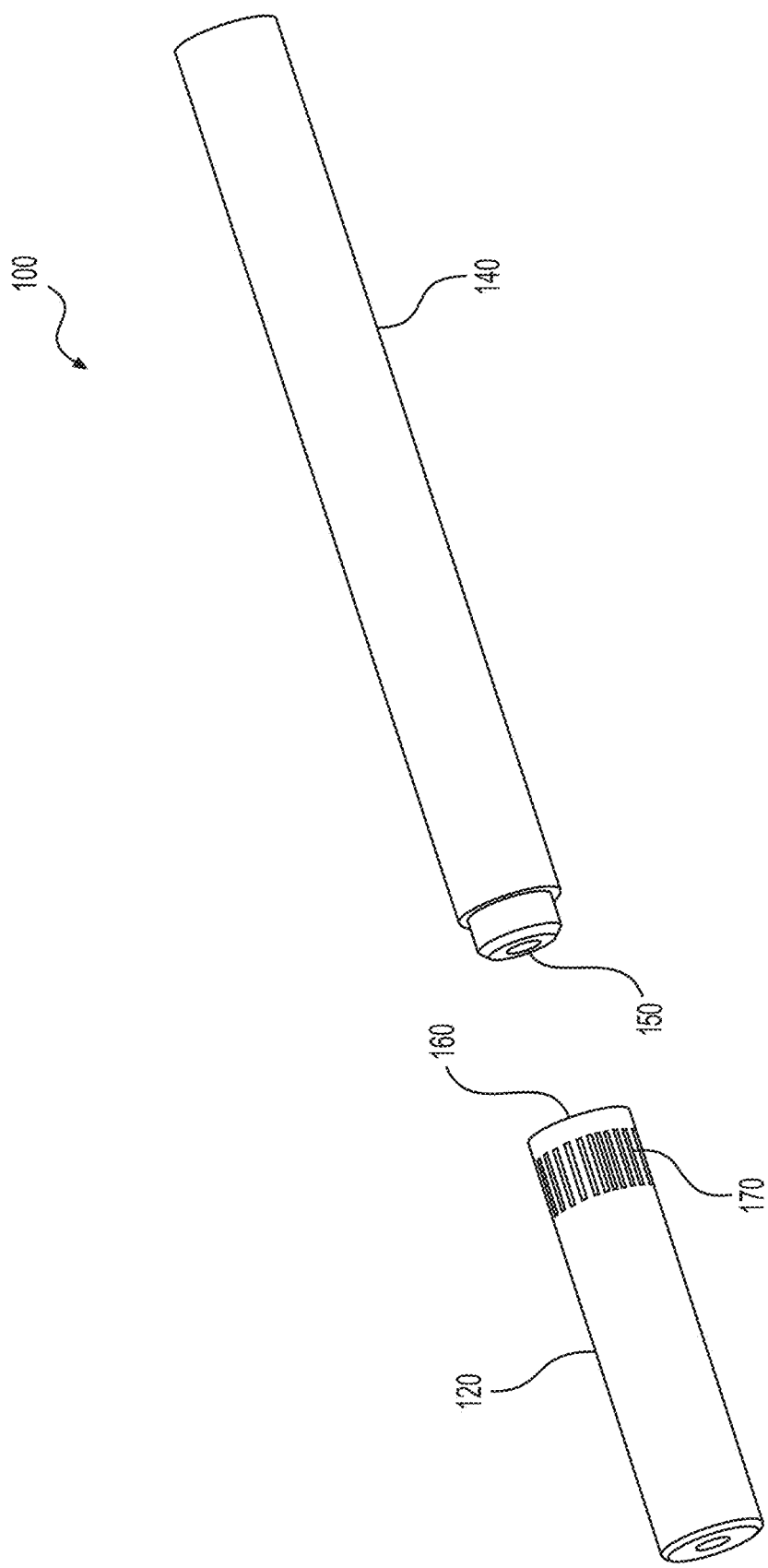
FIG. 1 illustrates an electronic vaping (e-vaping) device according to an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer, or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, or the like may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 illustrates an electronic vaping device according to an example embodiment.

Referring to FIG. 1, an electronic vaping (e-vaping) device 100 includes a replaceable cartridge 120 (which may also be referred to as a cartridge, a cartridge portion, a first section, or a cartridge section) and a battery section 140 (which may also be referred to as a battery portion, a second section, a power supply portion, or power supply section). The battery section 140 may be reusable and/or may include a reusable battery. The cartridge 120 may be any currently known, or to be developed cartridge, that includes a pre-dispersion formulation (or pre-vapor formulation) to generate vapor. The cartridge 120 may further include circuitry for heating the pre-dispersion formulation to be transformed into vapor.

The battery section 140 may include, among other components (e.g., battery level indicator, or the like), a battery for powering the cartridge 120 in the electronic vaping device 100.

In at least one example embodiment, the cartridge 120 and the battery section 140 may be physically (mechanically and/or electrically) connected to one another. In one example, such a physical connection is made possible via appropriate male/female connectors such as the male connector 150 (which may also be referred to as the first connector, first end or male end) and the female connector 160 (which may also be referred to as the second connector, second end or female end). While FIG. 1 illustrates the male connector 150 as being associated with the battery section 140 and the female connector 160 as being associated with the cartridge 120, example embodiments are not limited thereto. For example, the male connector 150 may be associated with the cartridge 120 and the female connector 160 may be associated with the battery section 140.

The physical connection may allow the battery section 140 to provide power to the cartridge 120 for operation of the electronic vaping device 100 (e.g., drawing vapor generated by heating a pre-dispersion formulation or pre-vapor formulation through an outlet of the replaceable cartridge 120).

In the example shown in FIG. 1, the physical connection between the cartridge 120 and the battery section 140 may be such that the male connector 150 at the battery section 140 is screwed into the female connector 160 at the cartridge 120.

If, however, the male connector 150 is associated with the cartridge 120 and the female connector 160 is associated with the battery section 140, then the physical connection between the cartridge 120 and the battery section 140 may be such that the female connector 160 at the battery section 140 is screwed into the male connector 150 at the cartridge 120. Although illustrated as a screw or threaded connection, the connectors discussed herein may be, for example, snug-fit connectors, detent connectors, clamp connectors, clasp connectors, or the like.

Still referring to FIG. 1, at the point of connection between the cartridge 120 and the battery section 140, there may be one or more pins establishing an electrical connection and/or communication between the cartridge 120 and the battery section 140.

As shown in FIG. 1, the cartridge 120 may further include an identification label 170 on a body of the cartridge 120. The identification label 170 may include one or more of a barcode, a quick response (QR) code, a Near Field Communication (NFC) tag, a special (e.g., magnetic) ink, or any other type of identification label readable by a reader such as a laser, a MiCR reader, combination thereof, or other reading device. However, example embodiments should not be limited to these examples. Special ink, such as magnetic ink, may include a magnetic ink character recognition (MiCR) code, which is a character-recognition technology that allows a MiCR reader to scan and read information directly from the mark or label created using the special ink. While the identification label 170 is shown as being on a particular portion of the body of the cartridge 120 in FIG. 1, example embodiments are not limited thereto. Rather, the identification label 170 may be at any location on the cartridge 120.

According to at least some example embodiments, the cartridge identification label 170 may be, or further include, a watermark, which is invisible to the naked eye, but may be recognized using a reader (e.g., an optical reader) and a watermark decoding algorithm. If the cartridge identification label 170 is, or includes, a watermark, then attempts to counterfeit the cartridge identification label 170 may result in loss of the watermark (or watermark encoding), thereby rendering the counterfeit label invalid and incapable of being authenticated. As is generally known, examples of watermarks may be patterns of dots of varying sizes over a very narrow range of color tones, which are spatially arranged in a manner that the sizes, color tones and spatial arrangement together constitute the watermark. A watermark decoding algorithm (also referred to as a reader algorithm) is "tuned" to the specific patterns of the watermark, which may be printed on the cartridge identification label 170 by a printing machine. Any attempt to counterfeit such label, even by scanning the cartridge identification label 170 with a high-quality scanner, and re-printing the label with a high-quality printer that is unaware of the unique recognition characteristics would introduce impurities, thereby causing the watermark decoding algorithm to fail.

The operation of the electronic vaping device 100 and the manner in which the battery section 140 operates and provides power to the cartridge 120 for heating the pre-dispersion formulation in the cartridge 120 may be based on any known, or to be developed, method. For example, as described herein, an electronic vaping device may include one or more of the features set forth in U.S. Patent Application Publication No. 2013/0192623 to Tucker et at, filed Jan. 31, 2013, the entire contents of which is incorporated herein by reference. In other example embodiments, the electronic vaping device may include the features set forth in U.S. patent application Ser. No. 15/135,930, filed Apr. 22, 2016; U.S. patent application Ser. No. 15/135,923, filed Apr. 22, 2016; and/or U.S. Pat. No. 9,289,014, issued Mar. 22, 2016, the entire contents of each of which is incorporated herein by reference. As used herein, the term "electronic vaping device" or "e-vaping device" is inclusive of all types of electronic vaping devices, regardless of form, size or shape.

Figure 2A:
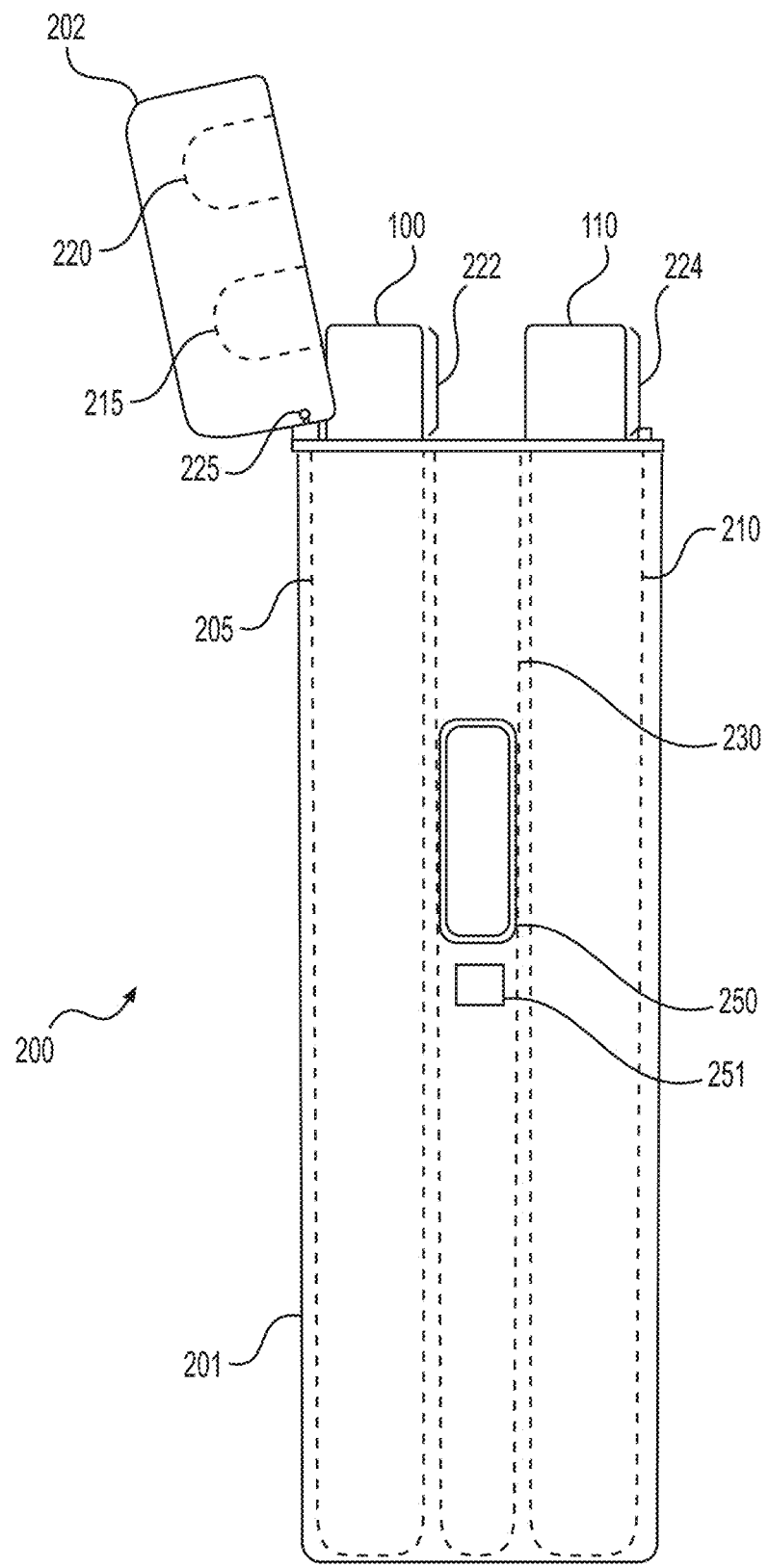
FIG. 2A illustrates an example embodiment of a personal charging case for an electronic vaping device.

FIG. 2A illustrates an example embodiment of a personal charging case (PCC) for an electronic vaping device.

Referring to FIG. 2A, a PCC 200 includes a body element 201 (which may hereinafter be referred to as a PCC "body"). The body 201 includes slots 205 and 210. Each of the slots 205 and 210 is configured to receive one electronic vaping device such as the electronic vaping device 100 shown in FIG. 1. While FIG. 2A illustrates the body 201 as having two slots to receive two electronic vaping devices (e.g., the electronic vaping device 100 of FIG. 1 in the slot 205 and a same or similar electronic vaping device 110 in the slot 210), example embodiments are not limited to this example. Rather, the body 201 may include any number of slots (e.g., 1 slot, 3 slots, or the like).

The PCC 200 includes a cover element 202, which is also referred to herein as a PCC "cover". The cover 202 includes slots 215 and 220. Each of the slots 215 and 220 corresponds to one of the slots 205 and 210 in the body 201. Each of the slots 215 and 220 is configured to receive a portion of an electronic vaping device that extends outside of a corresponding one of the slots 205 and 210. The portion of the electronic vaping device 100 extending outside of the slot 205 is indicated by the reference numeral 222 (hereinafter, the extended portion 222) and the portion of the electronic vaping device 110 extending outside of the slot 210 is indicated by the reference numeral 224 (hereinafter, the extended portion 224). Accordingly, each of the slots 205 and 210 in the body 201 together with a corresponding one of the slots 215 and 220 in the cover 202 collectively establish an enclosure in which the assembled electronic vaping device 100 or the assembled electronic vaping device 110 may be accommodated.

In at least one alternative example embodiment, instead of having slots 215 and 220, the cover 202 may have an empty/hollow section inside for covering the extended portions 222 and 224 of the electronic vaping devices 100 and 110.

In the example embodiment shown in FIG. 2A, the cover 202 is attached to the body 201 via a hinge 225. In this example, the cover 202 rotates/pivots about the hinge 225 to allow the cover 202 to be opened and closed while remaining attached to the body 201. The cover 202 completely covers an upper portion of the body 201 when the cover 202 is closed.

According to at least one example embodiment, the body 201 and the cover 202 of the PCC 200 may be made of metallic, plastic or any combination of suitable material or materials.

Still referring to FIG. 2A, the PCC 200 further includes a divider 230 separating the slots 205 and 210.

The body 201 of the PCC 200 includes a display 250 (e.g., on the exterior thereof). The display 250 may be any type of known, or to be developed, digital display. For example, the display 250 may be a liquid crystal display (LCD) display, a light emitting diode (LED) display, an organic LED (OLED) display, an electrophoretic (electronic paper (e-paper)) display, or the like. As will be described below, the display 250 may display information (provide a visual output or a visual indication) regarding the PCC 200, the electronic vaping device 100 and/or the electronic vaping device 110, including, but not limited to, a status of the cartridge 120 of the electronic vaping device 100 (or that of the electronic vaping device 110), a status of the battery section 140 of the electronic vaping device 100 (or that of the electronic vaping device 110) and/or a status of a battery of the PCC 200. The status of the cartridge 120 may correspond to, for example, the amount of pre-dispersion formulation remaining inside the cartridge 120. The status of the battery section 140 may correspond to, for example, the amount of charge remaining inside the battery of the battery section 140. The status of the battery of the PCC 200 may correspond to, for example, the amount of charge remaining inside the battery of the PCC 200.

The PCC 200 also includes a speaker (audio output provider) 251. The speaker 251 may be any known, or to be developed, speaker capable of outputting audio signals (or audio indications). According to at least some example embodiments, various types of information regarding the PCC 200 and/or the electronic vaping device 100 may be communicated by outputting audio signals through the speaker 251. In at least one example embodiment, the information conveyed via the display 250 may also (or alternatively) be conveyed in the form of audio signals or audio indications via the speaker 251.

Figure 2B:
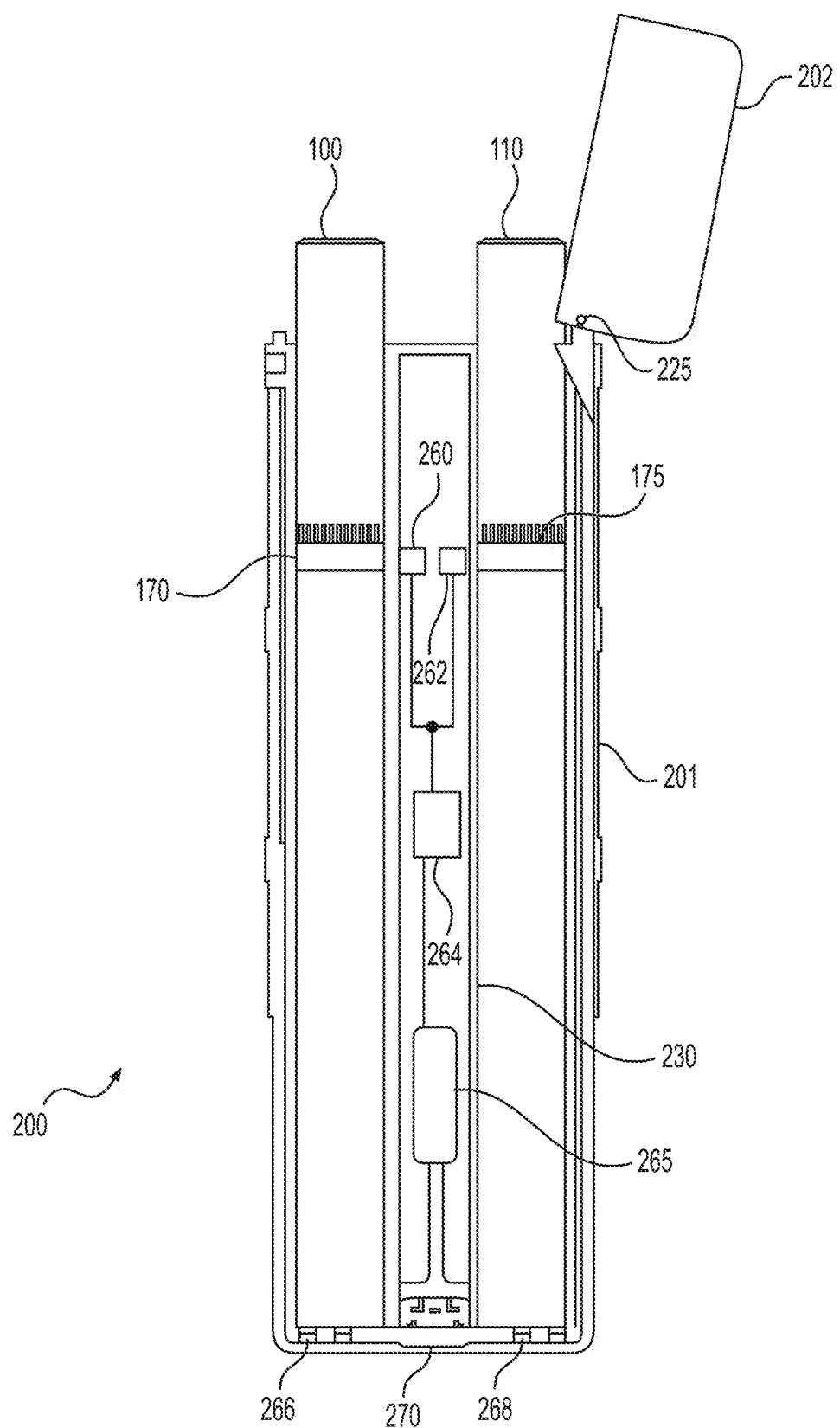
FIG. 2B illustrates an internal or cut-away view of the personal charging case shown in FIG. 2A.

FIG. 2B illustrates an internal or cut-away view of the PCC shown in FIG. 2A. In the example embodiment shown in FIG. 2B, the two electronic vaping devices 100 and 110 are inserted into the slots 205 and 210, respectively.

Referring to FIG. 2B, the PCC 200 includes cartridge readers (e.g., sensors) 260 and 262, a controller 264, a battery 265 (which may also be referred to as the PCC battery 265), interfaces 266 and 268, and a charger input 270. In the example embodiment shown in FIG. 2B, the cartridge readers 260 and 262, the controller 264 and the charger input 270 are located along the divider 230 within the body 201 of the PCC 200. In this example, the PCC battery 265 is located along the divider 230 and in relatively close proximity to the controller 264. However, the exact positioning of the cartridge readers 260 and 262, the controller 264, the PCC battery 265, and the charger input 270 located along the divider 230, is not limited to the example shown in FIG. 2B.

In the example embodiment shown in FIG. 2B, each of the cartridge readers 260 and 262 is associated with a corresponding one of the slots 205 and 210, and positioned to align with the position of the identification label of the electronic vaping device inserted in the corresponding slot. In this example, the cartridge reader 260 is positioned to align with, and read, the identification label 170 of the electronic vaping device 100 inserted into the slot 205, and the cartridge reader 262 is positioned to align with, and read, an identification label 175 of the electronic vaping device 110 inserted into the slot 210.

According to at least one other example embodiment, the PCC 200 may include a single cartridge reader for reading the identification labels of the electronic vaping devices inserted into the corresponding one of the slots 205 and 210. While FIG. 2B shows the electronic vaping devices 100 and 110 as being inserted into the slots 205 and 210, example embodiments are not limited thereto and any type of electronic vaping device may be inserted into the slots 205 and 210.

Still referring to FIG. 2B, the cartridge readers 260 and 262 may be any known, or to be developed, readers capable of reading the identification labels 170 and 175 provided on the electronic vaping devices 100 and 110, respectively. For example, the cartridge readers 260 and 262 may be a near-field communication (NFC) reader, a laser for reading a barcode and/or a QR code, a MiCR reader, an optical reader, a combination thereof, or the like.

The controller 264, which will be further described below with reference to FIG. 3, may include a memory, processing circuitry (e.g., a processor or other integrated circuitry) and a transceiver. In at least one example embodiment, in response to receiving a reading of the identification label 170 or the identification label 171 from the corresponding one of the cartridge readers 260 and 262, the controller 264 selectively enables (controls) the battery inside the battery section 140 for powering the cartridge 120. This, as well as additional, functionality of the controller 264 will be further described below with reference to FIGS. 4 and 5.

Returning to FIG. 2B, the PCC battery 265 may be any known, or to be developed, battery capable of powering the PCC 200, charging an electronic vaping device inserted into the PCC 200 and/or being charged when the PCC 200 is connected to an external power source via the charger input 270. In at least one example embodiment, when the electronic vaping device 100 is inserted into the slot 205 or 210, the PCC battery 265 of the PCC 200 may charge the battery section 140 of the electronic vaping device 100 via the corresponding one of the interfaces 266 and 268 (e.g., via electrical pins of the interface 266 or 268 configured to establish an electric connection between the inserted electronic vaping device 100 and the PCC 200).

The charger input 270 may be positioned at the bottom of the body 201 of the PCC 200. However, example embodiments are not limited thereto. The charger input 270 may be used for connecting the PCC 200 to an external power source for charging the PCC battery 265 and/or charging a battery (e.g., the battery section 140) in the electronic vaping devices 100 and 110 once inserted into the PCC 200. According to at least one example embodiment, it is possible to charge the battery section 140 either via the PCC battery 265 or via the external power source. According to at least some example embodiments, the charger input 270 may be a universal serial bus (USB) connection, such as a micro USB connection, USB-C connection, or the like.

As shown in FIG. 2B, each of the interfaces 266 and 268 may be positioned at the bottom of the corresponding one of the slots 205 and 210. Upon placement of the electronic vaping devices 100 and 110 into the slots 205 and 210, respectively, a physical (e.g., an electrical and/or mechanical) connection may be established between the inserted electronic vaping device (or, more specifically, between the battery section of the inserted electronic vaping device) and the corresponding interface via the corresponding pins, as described above. In the example shown in FIG. 2B, the interface 266 detects a physical connection between the electronic vaping device 100 and the interface 266, and the interface 268 detects a physical connection between the electronic vaping device 110 and the interface 268.

The interfaces 266 and 268 may facilitate transfer of power from a power source (e.g., the PCC battery 265 of the PCC 200 and/or the external power source connected to the charger input 270) to a battery section (e.g., the battery section 140) of the respective electronic vaping device 100 or 110.

In yet another example embodiment, each of the interfaces 266 and 268 may include processing circuitry and at least one resistive element (collectively referred to as circuitry). In one example embodiment, the circuitry may be utilized to generate a resistance when the electronic vaping devices 100 and/or 110 is/are inserted in, and a physical connection is established with, the corresponding slots 205 and/or 210. In at least one example embodiment, the circuitry may be further configured to send the generated resistance to the controller 264 to indicate the established connection, and the controller 264 may detect the established physical connection between the electronic vaping devices 100 and/or 110 and the corresponding slots 205 and/or 210 based on the generated resistance.

According to at least one example embodiment, and for purposes of detecting the above-described physical connection(s) and/or generating the above-described resistance, the interfaces 266 and 268 may operate as set forth in U.S. patent application Ser. No. 15/067,323 to Husejnovic et at, filed Mar. 11, 2016, the entire contents of which are incorporated herein by reference.

Various example connections between the controller 264, the PCC battery 265, the interfaces 266 and 268 as well as the charger input 270 will be further described below with reference to FIG. 2C.

Figure 2C:
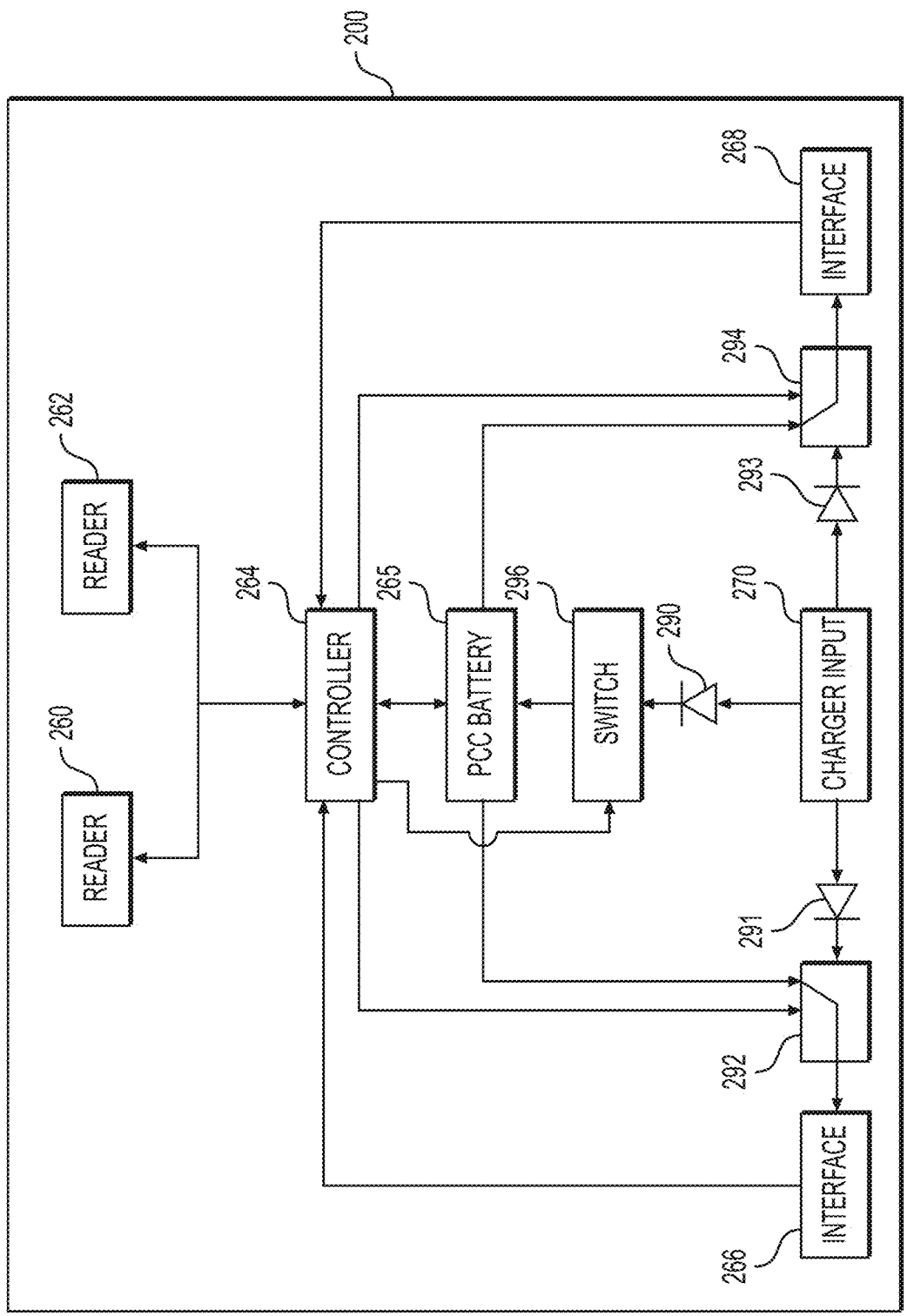
FIG. 2C is a block diagram illustrating example electrical connections between various components of the personal charging case shown in FIG. 2A.

FIG. 2C is a block diagram illustrating example electrical connections among various components of the PCC 200 shown in FIGS. 2A and 2B. As shown in FIG. 2C, the controller 264 is connected to the PCC battery 265 and the readers 260 and 262. In this example embodiment, the PCC battery 265 provides power to the controller 264 for operation thereof. As discussed in more detail below, the controller 264 may send commands to and/or receive identification and authentication data from one or more of cartridge readers 260 and 262. The controller 264 is also connected to switches 292, 294, 296, and interfaces 266 and 268. More detailed discussion of the controller 264 is provided later.

The PCC battery 265 is connected to interfaces 266 and 268 via corresponding switches 292 and 294, which will be further described below. Although not specifically shown in FIG. 2C, a diode may be connected between the PCC battery 265 and the switch 292 to ensure unidirectional flow of electrical charge from the PCC battery 265 to the battery of the battery section 140 through the interface 266 (e.g., for purposes of charging the battery of the battery section 140). Similarly, a diode may be connected between the PCC battery 265 and the switch 294 to ensure unidirectional flow of electrical charge from the PCC battery 265 to the battery of the battery section 140 through the interface 268 (e.g., for purposes of charging the battery of the battery section 140).

In FIG. 2C, the charger input 270 is connected to the PCC battery 265 via a diode 290 and a switch 296. In the example embodiment shown in FIG. 2C, the charger input 270 is connected to the anode of the diode 290 and the switch 296 is connected to the cathode of the diode 290 to ensure a unidirectional flow of electrical charge from the external power source to the PCC battery 265 (e.g., for purposes of charging the PCC battery 265 when connected to an external power source). In this example embodiment, the controller 264 controls the switch 296 to selectively allow power to flow from the charger input 270 to the PCC battery 265. In one example embodiment, the controller 264 closes the switch 296 to allow power to flow from the charger input 270 to the PCC battery 265.

As also shown in FIG. 2C, the charger input 270 is connected to the interface 266 via a diode 291 and a switch 292. In the example embodiment shown in FIG. 2C, the charger input 270 is connected to the anode of the diode 291 and the switch 292 is connected to the cathode of the diode 291 to ensure a unidirectional flow of electrical charge from the external power source to the interface 266 (e.g., for purposes of charging a battery of the battery section 140 of the electronic vaping device 100 once inserted into the slot 105). In this example embodiment, the controller 264 controls the switch 292 to selectively allow power to flow from the PCC battery 265 and/or an external power source to the interface 266. In one example embodiment, the controller 264 may close the switch 292 to allow power to flow from the PCC battery 265 and/or the external power source to the interface 266. In another example, the controller 264 may control the switch 292 to allow power to flow from the PCC battery 265 or the charger input 270 to the interface 266.

The charger input 270 is also connected to the interface 268 via a diode 293 and a switch 294. The charger input 270 is connected to the anode of the diode 293, and the switch 294 is connected to the cathode of the diode 293 to ensure a unidirectional flow of electrical charge from the external power source to the interface 268 (e.g., for purposes of charging a battery of the battery section 140 of the electronic vaping device 100 once inserted into the slot 210). In this example embodiment, the controller 264 controls the switch 294 to selectively allow power to flow from the PCC battery 265 and/or an external power source to the interface 268. In at least one example embodiment, the controller 264 may close the switch 294 to allow power to flow from the PCC battery 265 and/or the external power source to the interface 268. In another example, the controller 264 may control the switch 294 to allow power to flow from the PCC battery 265 or the charger input 270 to the interface 268.

According to at least some example embodiments, the switches 292, 294 and 296 may be any well-known switch, including any suitable transistor or other electrical circuit or electromechanical structure.

Figure 3:
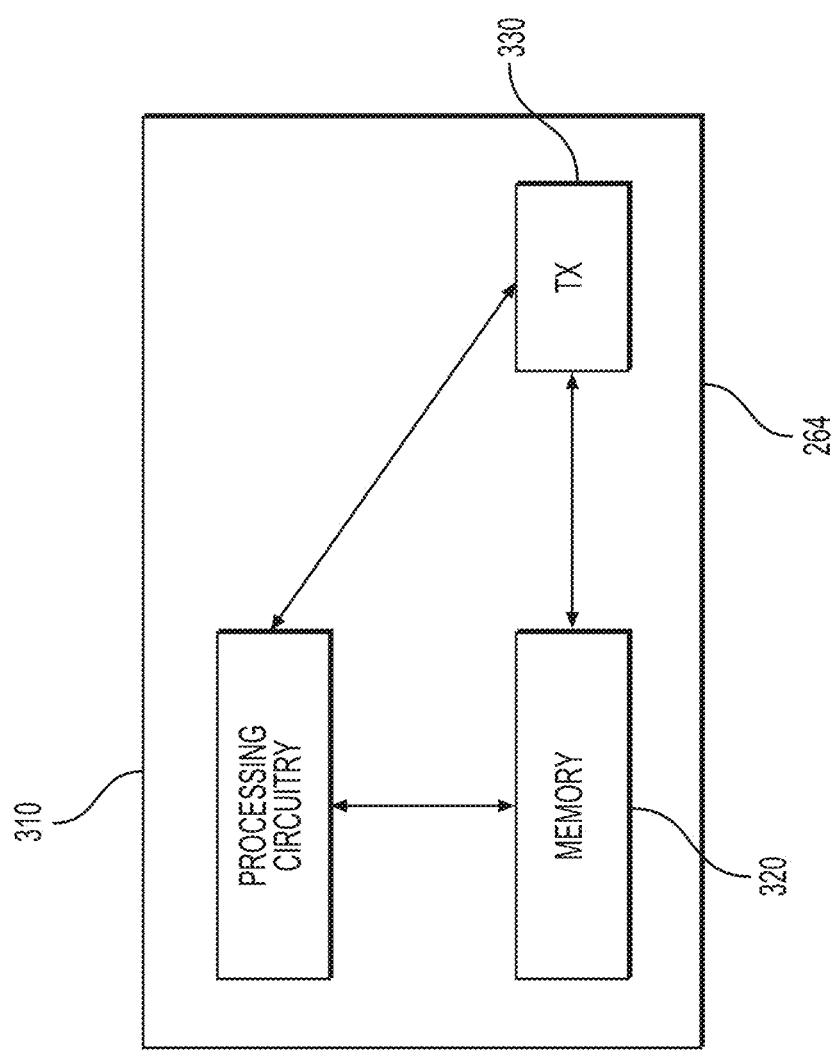
FIG. 3 illustrates an example embodiment of the controller 264 of the personal charging case shown in FIGS. 2A-2C.

FIG. 3 is a block diagram illustrating an example embodiment of the controller 264 of the PCC 200 shown in FIGS. 2A-2C.

As shown in FIG. 3, the controller 264 includes processing circuitry (e.g., at least one processor) 310, a memory 320, and a transceiver 330. The processing circuitry 310, the memory 320, and the transceiver 330 are communicatively coupled with one another.

The transceiver 330 may be any known, or to be developed, transceiver for transmission and/or reception of data between the PCC 200 and a remote device. In one example embodiment, the transceiver 300 may enable the establishment of wireless communication between the PCC 200 and the remote device, as will be described below.

In at least one example embodiment, the processing circuitry 310 may include at least one processor. In this example, the processor may be any known, or to be developed, processor configured to execute computer-readable instructions stored on the memory 320. Execution of the computer-readable instructions stored on the memory 320 transforms the at least one processor into a special purpose processor for carrying out the functionality described herein (e.g., authenticating the cartridge 120, enabling charging of the battery inside the battery section 140, or the like).

Although discussed in some cases with regard to a processor and a memory, according to at least some example embodiments, the controller 264 (or control circuitry or processing circuitry) may be (or include) hardware, firmware, hardware executing software, or any combination thereof. For example, the controller 264 may include one or more Central Processing Units (CPUs), digital signal processors (DSPs), application-specific-integrated-circuits (ASICs), field programmable gate arrays (FPGAs), or other circuitry configured as special purpose machines to perform the functions of the controller 264. Example functionality of the controller 264 will be described in more detail below with regard to FIGS. 4 and 5.

The processing circuitry 310 may send appropriate signals/commands to other components of the PCC 200, for example, a command to the battery section 140 to unlock the battery included therein to power the cartridge 120 in response to authentication of the cartridge 120 by the processing circuitry 310, or the like, as will be described below with reference to FIG. 4.

Figure 4:
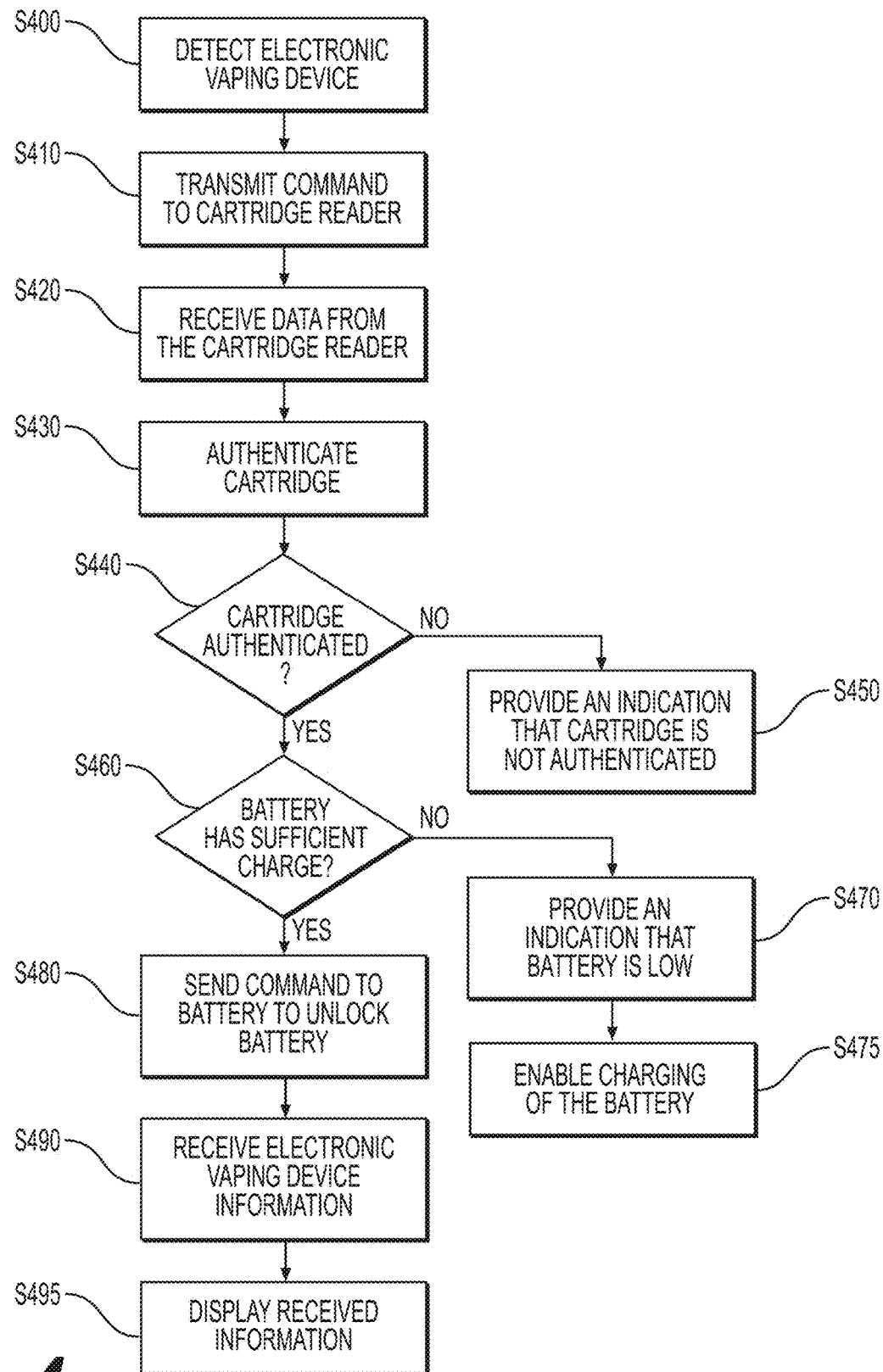
FIG. 4 is a flow chart illustrating a cartridge authentication method according to an example embodiment.

FIG. 4 is a flow chart illustrating a cartridge authentication method, according to an example embodiment. While FIG. 4 will be described from the perspective of the controller 264, it will be understood that each cartridge authentication process may be performed by the processing circuitry 310 of the controller 264. Furthermore, FIG. 4 will be described with reference to the electronic vaping device 100 being inserted into the slot 205 of the PCC 200. It should be understood, however, that the process shown in FIG. 4 may be applied (e.g., serially, concurrently, and/or simultaneously) with regard to an electronic vaping device (e.g., the electronic vaping device 110) inserted into the slot 210 of the PCC 200.

Referring to FIG. 4, when the electronic vaping device 100 is inserted into the slot 205, at S400 the controller 264 detects insertion of the electronic vaping device 100 into the slot 205 of the PCC 200. In one example, the battery section 140 may be in a locked state when the electronic vaping device 100 is inserted into the slot 205. When the battery section 140 is in the locked state, the battery inside the battery section 140 is not permitted to power the cartridge 120, even when the electronic vaping device 100 is in the slot 205 and the cartridge 120 is connected to the battery section 140.

The controller 264 may detect insertion of the electronic vaping device 100 into the slot 205 of the PCC 200 based on a change in resistance at the interface 266 (e.g., from essentially infinite resistance to a finite resistance value) resulting from attachment of the electronic vaping device 100 to the interface 266. The controller 264 may sense the change in the resistance through connection with the interface 266.

In response to detecting the electronic vaping device 100, at S410 the controller 264 transmits (or sends) a command to the cartridge reader 260 to read the identification label 170 of the electronic vaping device 100 that has been inserted into the slot 205. In response to receiving the command, the cartridge reader 260 reads the identification label 170 of the electronic vaping device 100.

In at least one alternative example, the controller 264 need not send a command to the cartridge reader 260 at S410. Rather, the cartridge reader 260 may automatically read the identification label 170 of the electronic vaping device 100 when the electronic vaping device 100 is inserted in the slot 205. In one example, the cartridge reader 260 may be an optical reader in an "always ON" state. Therefore, when the electronic vaping device 100 is inserted into the slot 205, the optical reader automatically reads (scans) the identification label 170 and sends the read information to the controller 264.

Returning to FIG. 4, at S420 the controller 264 receives identification and/or authentication data (also referred to herein as identification information, identification and authentication information, or authentication information) from the cartridge reader 260. The identification data may be obtained from, or included in, the identification label 170 read by the cartridge reader 260.

At S430, the controller 264 authenticates the cartridge 120 of the electronic vaping device 100. In one example, the controller 264 authenticates the cartridge 120 by comparing the identification data received at S420 (received identification data) with reference identification data stored in the memory 320 of the controller 264. As discussed herein, the authentication of the cartridge 120 by the controller 264 may also be referred to as verification of authenticity, authentication of the cartridge, or the like.

According to at least one example embodiment, the memory 320 stores a database of reference identification data corresponding to authorized cartridges. Each reference identification data may correspond to a cartridge identifier (e.g., serial number) of an authorized cartridge or group of cartridges, which may be commercially available. An authorized cartridge may also be referred to herein as an authentic cartridge. The reference identification data may further include an expiration date associated with each authorized cartridge.

According to at least one example embodiment, the database of reference identification data stored on the memory 320 may be updated periodically. In one example, the PCC 200 may be connected (e.g., via wired or wireless connection) to a computer or a handheld device (e.g., a mobile phone or a tablet) via the transceiver 330. In this example, the transceiver 330 transmits and receives data to and from such a computer or handheld device.

The computer or the handheld device may have an application executed thereon. Through the application, the computer or the handheld device may send appropriate commands to the PCC 200 (e.g., to the receiver 300 of the controller 264) to update the database of reference identification data stored on the memory 320.

If the identification label 170 is, or includes, a watermark, then the cartridge reader 260 converts optical information obtained from the watermark into digital information, and sends the digital information to the controller 264. Upon receiving the digital information obtained from the watermark from the cartridge reader 260, the controller 264 applies a watermark decoding algorithm to the digital information received from the cartridge reader 260 to verify the authenticity of the cartridge 120. The watermark and watermark decoding algorithm may be any known, or to be developed watermark and watermark decoding algorithm. An example of a watermark and watermark decoding algorithm that may be implemented in accordance with example embodiments is described in U.S. Pat. No. 6,708,894, the entire contents of which is incorporated herein by reference.

Returning to FIG. 4, at S440 the controller 264 determines whether the authentication of the cartridge 120 was successful. In the example in which the authentication of the cartridge 120 is based on identification data from the cartridge reader 260, the controller 264 may determine that the authentication of the cartridge 120 was successful if the received identification data matches reference identification data stored in the memory 320. If the received identification data does not match reference identification data stored in the memory 320, then the controller 264 determines that the authentication of the cartridge 120 was not successful (the authentication failed).

If the reference identification data further includes an expiration date associated with the authorized cartridge, then the controller 264 may determine if the cartridge 120 has expired (e.g., the expiration date, or a threshold time period after the expiration date, of the cartridge 120 has passed). If the received identification data matches reference identification data and the cartridge 120 has not expired, then the controller 264 determines that the authentication of the cartridge 120 was successful. However, if the received identification data matches the reference identification data, but the cartridge 120 has expired, then the controller 264 determines that the cartridge 120 is not authorized and the authentication process for the cartridge 120 may still fail even when the received identification data matches the reference identification data.

If the data received from the cartridge reader 260 is, or includes, digital information corresponding to optical information obtained from a watermark, then the controller 264 determines that the authentication of the cartridge 120 was successful if application of the watermark decoding algorithm is successful. If application of the watermark decoding algorithm fails, then the controller 264 determines that the authentication of the cartridge 120 was not successful, and that the cartridge 120 is not authentic, at S430.

Returning to S440 in FIG. 4, if the controller 264 determines that the cartridge 120 is not authentic (the authentication process for the cartridge 120 has failed), then the controller 264 provides an indication that the cartridge 120 is not authentic at S450, and the controller 264 maintains the battery section 140 in a locked state such that the battery section 140 is not permitted to provide power to the cartridge 120. In this case, charging of the battery section 140 of the electronic vaping device 100 by the PCC 200 or the external power supply connected thereto may also be prevented. In at least one other example embodiment, the battery section 140 may be maintained in a locked state, but permitted to be charged by the PCC 200 or the external power supply.

In at least one example embodiment, the controller 264 may indicate that the authentication process for the cartridge 120 has failed by sending appropriate commands to instruct the display 250 and/or the speaker 251 (the controller 264 may drive the display 250 and/or the speaker 251) to: output a visual indication (e.g., a continuous or blinking red light, a written statement or text message, such as "unauthorized cartridge," or the like) on the display 250; provide an audio indication (e.g., a continuous or intermittent beep) via the speaker 251; or the like. Since appropriate commands and instructions for causing the display 250 and/or the speaker 251 to provide visual and/or audio indications are generally well-known, a detailed discussion is omitted.

In at least one example embodiment, the controller 264 may provide a combination of visual and audio indications to indicate that the cartridge 120 is not authentic (e.g., a combination of a continuous red light and a continuous beep). While specific audio and visual indications (or combinations thereof) have been described above as example ways for the controller 264 to communicate the status of the electronic vaping device at S450, example embodiments are not limited thereto and may encompass any other known, or to be developed, visual or audio indications (or combinations thereof).

Returning to S440 in FIG. 4, if the controller 264 determines that the cartridge 120 is authentic (the authentication process for the cartridge 120 was successful), then at S460 the controller 264 determines whether the battery section 140 (or a battery included in the battery section 140) has sufficient charge for powering the cartridge 120. In at least one example embodiment, the controller 264 receives information from the battery section 140 (which may be referred to as charge or battery information) indicating the remaining charge of the battery section 140. The controller 264 may receive the charge information from the battery section 140 (e.g., from processing circuitry, e.g., a microcontroller or processor, of the battery section 140) when the electronic vaping device 100 is inserted into the slot 205.

The controller 264 may determine that the battery section 140 has sufficient charge at S460 if the amount of charge left in the battery section 140, as indicated by the charge information, exceeds a desired (or, alternatively, given or predetermined) threshold. In one example, the threshold may be about 10% or 20% of the total charge capacity (e.g., about 90 mAh) of the battery section 140.

If, at S460, the controller 264 determines that the battery section 140 does not have sufficient charge to power the authenticated cartridge 120, then at S470 the controller 264 sends appropriate commands to instruct the display 250 and/or the speaker 251 (the controller 264 may drive the display 250 and/or the speaker 251) to provide visual and/or audio indications that the battery inside the battery section 140 needs to be replaced and/or recharged. The controller 264 may drive the display 250 and/or the speaker 251 in the same or substantially the same manner as discussed above with regard to S450.

At S475, the controller 264 enables charging of the battery inside the battery section 140. An example embodiment of a process of enabling the charging of the battery section inside the battery section 140 will be further described with reference to FIG. 5.

Returning to S460, if the controller 264 determines that the battery in the battery section 140 has sufficient charge to power the cartridge 120, then at S480 the controller 264 sends a command to the battery section 140 to unlock the battery section 140 (transition the battery to an unlocked state), thereby permitting the battery of the battery section 140 to power the cartridge 120. The controller 264 may send the command to unlock the battery section 140 to the battery section 140 via the interface 266. According to at least some example embodiments, the controller 264 may cause the battery section 140 to transition to the unlocked state using any well-known methodology. Because such methods are well-known, a detailed discussion is omitted.

At S490, after unlocking the battery section 140, the controller 264 may receive various types of information regarding the electronic vaping device 100 from portions of the electronic vaping device 100. For example, the controller 264 may receive information from processing circuitry (e.g., one or more microcontrollers or processors) embedded within the cartridge 120 and/or the battery section 140 of the electronic vaping device 100. The information may be transferred to the controller 264 via the interface 266 after the controller 264 sends a command to the battery section 140 to unlock the battery section 140 for powering the cartridge 120.

In one example, the information may include: a status of the cartridge 120 (e.g., the amount of pre-dispersion formulation remaining in the cartridge 120); a remaining charge level of the battery section 140; maintenance and/or replacement reminders for the cartridge 120 and/or the battery section 140; or the like.

Referring still to FIG. 4, at S495 the controller 264 may display at least some of the information received at S490 on the display 250. The controller 264 may drive the display 250 to display the received information in the same or substantially the same manner as discussed above with regard to S450.

According to at least one example embodiment, when the cartridge 120 is authenticated by the controller 264 after the electronic vaping device 100 is inserted into the PCC 200, the electronic vaping device 100 may be enabled for vaping, and the electronic vaping device 100 may be removed from the PCC 200 for vaping. In one example, the controller 264 may display a green light on the display 250 to indicate that the electronic vaping device 100 is enabled and may be removed for vaping.

In at least one example embodiment, the authentication of the cartridge 120 remains valid (e.g., the battery section 140 continues to power the cartridge 120) until the battery section 140 and the cartridge 120 are separated from one another. Thereafter, in order for the battery section 140 to power the cartridge 120, the authentication process of FIG. 4 may need to be repeated.

An example embodiment of a method for selectively enabling charging of the battery inside the battery section 140 at S475 will be described below with reference to FIG. 5.

Figure 5:
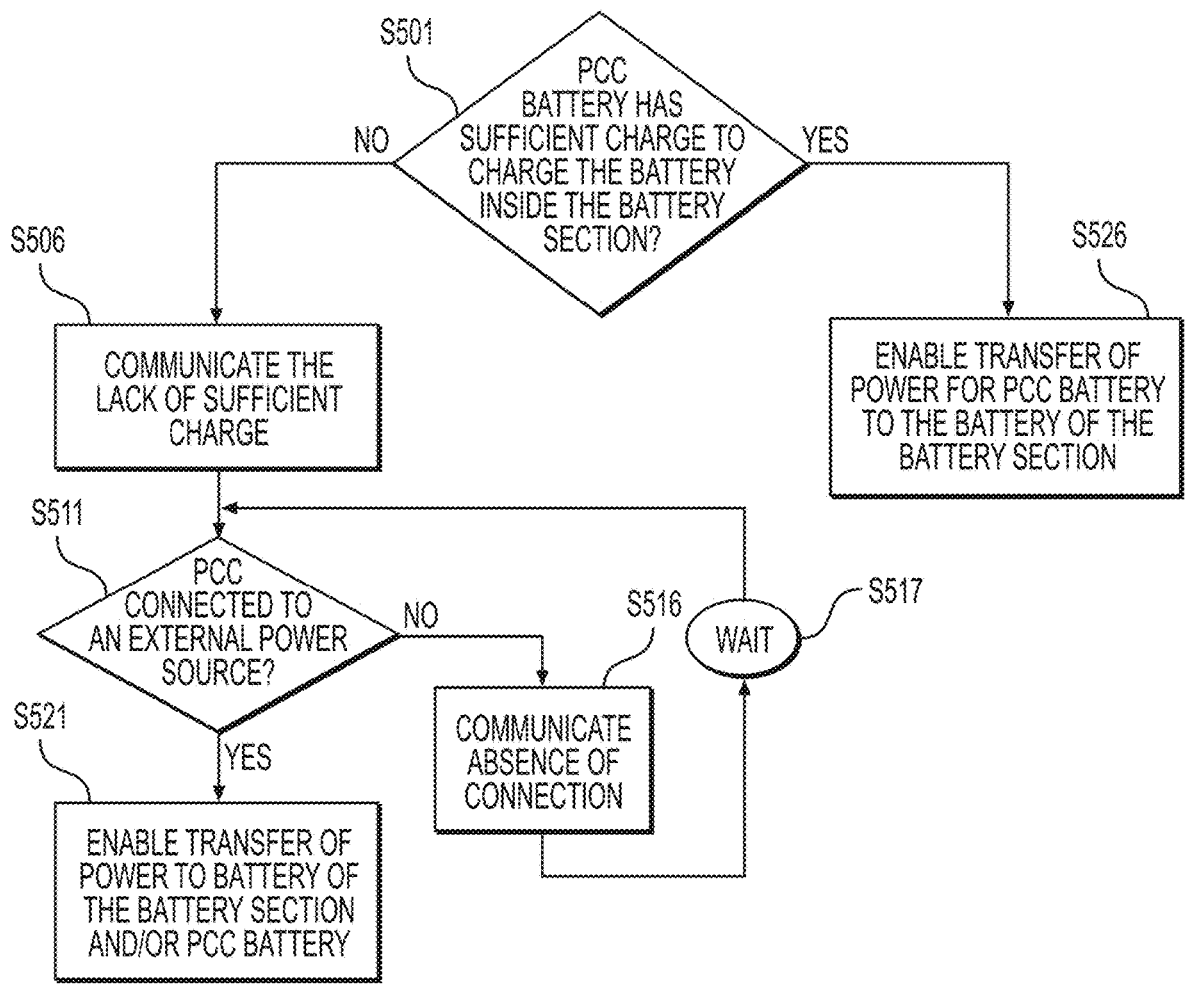
FIG. 5 is a flow chart illustrating an example embodiment of a method for enabling charging of a battery inside the battery section of an electronic vaping device.

FIG. 5 illustrates an example embodiment of a method of enabling charging of a battery inside the battery section of an electronic vaping device. As shown in FIG. 2B, and described above, the PCC 200 may include PCC battery 265, which is electrically connected to the controller 264 as well as the interfaces 266 and 268. As with FIG. 4, the example embodiment shown in FIG. 5 will be described with reference to the electronic vaping device 100 being inserted into the slot 205 of the PCC 200. It should be understood, however, that the process shown in FIG. 5 may also be applied with regard to the electronic vaping device 110 and the slot 210 of the PCC 200.

Referring to FIG. 5, at S501 the controller 264 determines whether the PCC battery 265 has sufficient charge for charging the battery of the battery section 140 of the electronic vaping device 100. In at least one example embodiment, the controller 264 obtains and/or receives information from the PCC battery 265 (which may be referred to as PCC charge or battery information) indicating the remaining charge of the battery section 140. The controller 264 may obtain and/or receive the charge information from the PCC battery 265 in any well-known manner.

If, at S501, the controller 264 determines that the PCC battery 265 of the PCC 200 has sufficient power to charge the battery of the battery section 140, then at S526 the controller 264 enables transfer of power from the PCC battery 265 of the PCC 200 to the battery section 140. In one example embodiment, the controller 264 enables the transfer of power by closing the switch 292 between the PCC battery 265 and the interface 266 (as shown in FIG. 2C), thereby electrically connecting the PCC battery 265 and the battery section 140. In this case, the PCC battery 265 charges the battery inside the battery section 140 via the interface 266.

Returning to S501, if the controller 264 determines that the PCC battery 265 does not have sufficient charge for charging the battery of the battery section 140, then at S506 the controller 264 communicates the lack of sufficient charge of the PCC battery 265 by, for example, providing a visual output on the display 250 (e.g., a red light) and/or an audio output via the speaker 251 (e.g., a continuous beep). The controller 264 may drive the display 250 and/or the speaker 251 in the same or substantially the same manner as discussed above with regard to S450.

When charging of the PCC battery 265 is needed, the PCC 200 may be connected to an external power source via the charger input 270 to charge the PCC battery 265.

At S511, the controller 264 determines whether the PCC 200 is connected to an external power source. In one example, the controller 264 determines that the PCC 200 is connected to an external power by sensing a voltage at the charger input 270 (e.g., an increase from 0 volts to a non-zero voltage value, such as 5 volts, or the like).

If, at S511, the controller 264 determines that the PCC 200 is not connected to an external power source, then at S516 the controller 264 communicates the absence of a connection of the PCC 200 to an external power source, for example, to an adult vaper. In one example embodiment, the controller 264 communicates the absence of the connection by providing a visual and/or audio signal through the display 250 and/or the speaker 251. The visual and/or the audio signal may be any one of a blinking light, a continuous light (e.g., a red light), a periodic audio sound, a continuous sound, or the like. However, such visual and/or audio signal is not limited to the examples discussed herein. According to at least some example embodiments, the controller 264 may drive the display 250 and/or speaker 251 in the same or substantially the same manner as discussed above with regard to S450 in FIG. 4.

After a delay at S517, the controller 264 then returns to S511 and rechecks whether the PCC 200 is connected to an external power supply. In at least this example, the controller 264 may periodically check and/or detect whether the PCC 200 is connected to an external power source. The length of the delay S517 and/or the periodicity of the check and/or detection by the controller 264 may be an adjustable parameter determined based on experiments and/or empirical studies. In one example, the length of the delay may be on the order of milliseconds or seconds. However, example embodiments are not limited to these examples. In another example, the controller 264 may remain in the WAIT state at S517 until the PCC 200 is connected to an external power source.

Returning to S511, if the controller 264 determines that the PCC 200 is connected to an external power source, then at S521 the controller 264 enables transfer of power from the external power source to the battery section 140 (for purposes of charging the battery inside the battery section 140) and/or the PCC battery 265. The controller 264 may enable transfer of power from the external power source to the battery section 140 through the interface 266 by enabling and/or closing the switch 292 to connect the charger input 270 to the interface 266 via the diode 291 and the switch 292. The controller 264 may enable transfer of power to the PCC battery 265 by enabling and/or closing the switch 296. In at least one example embodiment, power may be transferred to the battery of the battery section 140 and to the PCC battery 265 simultaneously, concurrently and/or in parallel. In yet another example, power may be transferred to the battery of the battery section 140 through the PCC battery 265. In still another example, the power may be transferred to the PCC battery 265 to charge the PCC battery 265 to a level sufficient to charge the battery of the battery section 140, and then the PCC battery 265 may charge the battery of the battery section 140 as discussed above with regard to S526.

According to one or more example embodiments described above, the process of authenticating the cartridge 120, and thereafter enabling the battery section 140 to power the cartridge 120 to enable vaping, is performed by a controller 264 of the PCC 200 when the electronic vaping device 100 (the cartridge 120 and the battery section 140 connected as one piece) is inserted into the PCC 200. However, in at least one example embodiment, the process of authenticating the cartridge 120 may be performed without using the PCC 200. Accordingly, the processing performed by the controller 264 may be incorporated into at least one processor (or, alternatively, microcontroller or processing circuitry) of the battery section 140. Furthermore, the cartridge reader 260 may be incorporated into the battery section 140.

According to one or more example embodiments, when the cartridge 120 is attached to the battery section 140, the cartridge reader 260 and the controller/microprocessor of the battery section 140 may perform the processes of reading the identification label 170 (e.g., the identification label 170 may be placed/engraved at the female end 160 of the cartridge 120 (as shown in FIG. 1)) and authenticating the cartridge 120, as described with reference to FIG. 4. In at least one example embodiment, doing so may suppress and/or eliminate the need for placing the electronic vaping device (e.g., the cartridge 120 and the battery section 140) inside a slot of a PCC, or other case, such as that described above with reference to the PCC 200.

In at least some example embodiments, the battery section 140 may be recharged wirelessly and/or via a power source using any known, or to be developed methods (e.g., the battery section 140 may have a charger input similar to the charger input 270 of the PCC 200, shown above with reference to FIG. 2B, through which the battery section 140 may be connected to an external power supply for charging the battery inside the battery section 140).

Although example embodiments are discussed herein with regard to a PCC, it should be understood that example embodiments may be applicable to a carrying case, which includes the reader circuitry discussed herein, but does not include one or more components of a PCC. According to at least one example embodiment, the PCC may instead be a case that includes a cartridge reader for authenticating cartridges, but does not charge an electronic vaping device.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A device configured to receive at least one electronic vaping device including a cartridge and a battery section, the device comprising:
   at least one sensor configured to obtain authentication information from an identification label of the cartridge of the at least one electronic vaping device, the authentication information includes identification information identifying the cartridge;
   a memory storing reference identification information for a plurality of cartridges;
   a device battery configured to charge the battery section of the at least one electronic vaping device;
   processing circuitry coupled to the at least one sensor, the processing circuitry configured to
      perform authentication of the cartridge based on the authentication information by determining whether the identification information corresponds to reference identification information stored in the memory, the reference identification including an expiration data,
      determine whether to unlock the battery section of the at least one electronic vaping device to power the cartridge based on a result of the authentication of the cartridge,
      unlock the battery section of the electronic vaping device when the identification information corresponds to the reference identification information,
      maintain the battery section in a locked state if the expiration date has passed,
      determine a charge level of the battery section, and
      determine a charge level of the device battery; and
   at least one switch configured to selectively connect at least one of (i) the device battery to the battery section or (ii) an external power source to the battery section based on the charge level of the battery section and the charge level of the device battery.

2. The device of claim 1, wherein the processing circuitry is further configured to
   detect attachment of the at least one electronic vaping device to the device; and
   perform the authentication of the cartridge in response to detecting the attachment of the at least one electronic vaping device to the device.

3. The device of claim 1, wherein the identification label is one of a barcode, a quick response (QR) code, a near field communication (NFC) tag and special ink.

4. The device of claim 3, wherein
   the special ink is a magnetic ink including a magnetic ink character recognition (MiCR) code; and
   the sensor includes a MiCR reader.

5. The device of claim 1, wherein
   the identification label further includes a watermark;
   the authentication information further includes digital information corresponding to the watermark; and
   the processing circuitry is further configured to
      perform the authentication of the cartridge by applying a watermark decoding algorithm to the digital information, and
      unlock the battery section when (i) the identification information corresponds to the reference identification information stored in the memory and (ii) application of the watermark decoding algorithm is successful.

6. The device of claim 1, wherein
   the identification label includes a watermark;
   the authentication information includes digital information corresponding to the watermark; and
   the processing circuitry is further configured to
      perform the authentication of the cartridge by applying a watermark decoding algorithm to the digital information, and
      determine whether to unlock the battery section of the electronic vaping device to power the cartridge based on a result of application of the watermark decoding algorithm.

7. The device of claim 6, wherein the processing circuitry is further configured to unlock the battery section if the application of the watermark decoding algorithm is successful.

8. The device of claim 1, further comprising:
   a memory having computer-readable instructions stored therein; and
   wherein the processing circuitry is further configured to execute the computer-readable instructions to perform the authentication of the cartridge and to control the battery section.

9. The device of claim 1, further comprising:
   a charger input configured to connect the device to the external power source.

10. A method for authenticating a cartridge of at least one electronic vaping device, the method comprising:
    reading an identification label of the cartridge of the at least one electronic vaping device, the at least one electronic vaping device including a battery section;
    obtaining authentication information from the identification label, the authentication information including identification information identifying the cartridge;
    obtaining reference identification information for a plurality of cartridges from a memory;
    determining whether the cartridge is authentic based on the authentication information by determining whether the identification information corresponds to reference identification information stored in the memory, the reference identification including an expiration date;
    unlocking the battery section in response to determining the cartridge is authentic and when the identification information corresponds to the reference identification information;
    maintaining the battery section in a locked state if the expiration date has passed;
    determining a charge level of the battery section of the at least one electronic vaping device;
    determining a charge level of a device battery within a device configured to receive the at least one electronic vaping device; and
    connecting at least one of (i) the device battery to the battery section or (ii) an external power source to the battery section based on the charge level of the battery section and the charge level of the device battery.

11. The method of claim 10, further comprising:
    sending a command to at least one sensor of the device to read the identification label of the cartridge.

12. The method of claim 10, further comprising:
    providing an indication that the cartridge is not authentic in response to determining the cartridge is not authentic.

13. A device comprising:
at least one slot configured to receive and hold at least one electronic vaping device, the at least one electronic vaping device including a cartridge and a battery section;
at least one sensor configured to obtain authentication information from an identification label of the at least one electronic vaping device, the authentication information associated with the cartridge and including identification information identifying the cartridge;
a memory storing reference identification information for a plurality of cartridges;
a device battery configured to charge the battery section of the at least one electronic vaping device;
a charger input configured to connect the device to an external power source;
processing circuitry configured to
perform authentication of the cartridge based on the authentication information to determine whether the cartridge is authentic by determining whether the identification information corresponds to reference identification information stored in the memory, the reference identification including an expiration date;
in response to determining that the cartridge is authentic and the identification information corresponds to the reference identification information, unlock the battery section to power the cartridge, determine a charge level of the battery section, and determine a charge level of the device battery, and
maintain the battery in a locked state if the expiration date has passed; and
a switch configured to selectively connect at least one of (i) the device battery to battery section or (ii) the external power source to the battery section via the charger input to charge the battery section of the electronic vaping device based on the charge level of the battery section and the charge level of the device battery.

14. The device of claim 13, further comprising:
a cover element having at least one hollow section corresponding to the at least one slot, the at least one hollow section configured to receive a portion of the at least one electronic vaping device that extends out of the at least one slot when inserted in the at least one slot, the cover element configured to be opened and closed, and to cover the at least one electronic vaping device when closed.

15. The device of claim 13, wherein the processing circuitry is further configured to detect insertion of the at least one electronic vaping device into the at least one slot by detecting a change in resistance at an interface associated with the at least one slot, the interface providing an electrical connection between the at least one electronic vaping device and the device.

16. The device of claim 15, wherein the at least one sensor is further configured to obtain the authentication information in response to detecting the insertion of the at least one electronic vaping device into the at least one slot by the processing circuitry.

17. The device of claim 13, wherein the identification label is on the cartridge.

18. The device of claim 13, further comprising:
two or more slots, each of the two or more slots configured to receive an electronic vaping device; and
a divider between the two or more slots, the divider configured to separate any two of the two or more slots; wherein
the at least one sensor and the processing circuitry are positioned on the divider.

19. The device of claim 13, wherein:
the memory includes computer-readable instructions stored therein; and
the processing circuitry is configured to execute the computer-readable instructions to perform the authentication of the cartridge, and to control the battery section.

20. The device of claim 13, wherein the processing circuitry is further configured to
determine whether a first battery of the battery section has sufficient charge for powering the cartridge; and
enable charging of the first battery in response to determining that the first battery of the battery section does not have sufficient charge for powering the cartridge.

21. The device of claim 20, further comprising:
a charger input configured to connect the device to an external power source; and
wherein the processing circuitry is further configured to enable the charging of the first battery of the battery section via at least one of the device battery or the external power source.

22. A method for authenticating a cartridge of at least one electronic vaping device, the method comprising:
detecting insertion of the at least one electronic vaping device into at least one slot of a device, the device including a device battery, the at least one electronic vaping device including a battery section;
reading an identification label of the cartridge of the at least one electronic vaping device;
obtaining authentication information from the identification label, the authentication information includes identification information identifying the cartridge;
obtaining reference identification information for a plurality of cartridges from a memory;
determining whether the cartridge is authentic based on the authentication information by determining whether the identification information corresponds to reference identification information stored in the memory, the reference identification including an expiration date;
unlocking the battery section of the electronic vaping device when the identification information corresponds to the reference identification information;
maintaining the battery section in a locked state if the expiration date has passed;
determining a charge level of the battery section of the at least one electronic vaping device in response to determining the cartridge is authentic;
determining a charge level of the device battery; and
connecting at least one of (i) the device battery to the battery section or (ii) an external power source to the battery section based on the charge level of the battery section and the charge level of the device battery.

23. The method of claim 22, wherein the detecting insertion of the at least one electronic vaping device includes detecting a change in resistance through connection of the at least one electronic vaping device to an interface of the device.

24. The method of claim 22, further comprising:
sending a command to a cartridge reader of the device to read the identification label of the cartridge.

25. The method of claim 22, further comprising:
sending a command to unlock the battery section in response to determining the cartridge is authentic.

26. The method of claim 22, further comprising:
sending information regarding the at least one electronic vaping device to a controller of the device.

27. The method of claim 26, wherein the information includes one or more of a remaining amount of fluid in the cartridge, the charge level of the battery section, cartridge replacement reminders, or battery section replacement reminders.

28. The method of claim 27, further comprising:
displaying the information on a display of the device.

* * * * *